US008260976B1

(12) United States Patent
Dhandapani

(10) Patent No.: US 8,260,976 B1
(45) Date of Patent: Sep. 4, 2012

(54) MULTIPLE FREQUENCY STATE DETECTION FOR SERIAL I/O INTERFACES

(75) Inventor: Kayalvizhi Dhandapani, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 889 days.

(21) Appl. No.: 12/363,077

(22) Filed: Jan. 30, 2009

(51) Int. Cl.
*G06F 3/00* (2006.01)
*G06F 13/14* (2006.01)
*G06F 11/00* (2006.01)

(52) U.S. Cl. ............... 710/15; 710/305; 714/25; 714/48

(58) Field of Classification Search ............ 710/15, 710/17–19, 29–30, 305–306; 714/1, 25, 714/30, 33, 37, 48, 49, 709, 715
See application file for complete search history.

(56) References Cited

U.S. PATENT DOCUMENTS

| | | | |
|---|---|---|---|
| 4,811,279 A * | 3/1989 | Bean et al. ............... | 710/305 |
| 5,793,946 A * | 8/1998 | Gauthier et al. ............ | 714/25 |
| 5,835,700 A | 11/1998 | Carbonneau | |
| 6,078,979 A | 6/2000 | Li et al. | |
| 6,145,020 A | 11/2000 | Barnett | |
| 6,374,317 B1 | 4/2002 | Ajanovic et al. | |
| 6,446,154 B1 * | 9/2002 | Ajanovic et al. ........... | 710/305 |
| 6,957,291 B2 | 10/2005 | Moon et al. | |
| 6,993,772 B2 | 1/2006 | Pike et al. | |
| 7,093,033 B2 | 8/2006 | Beckett | |
| 7,110,928 B1 | 9/2006 | Lee | |
| 7,383,371 B2 | 6/2008 | Kasahara | |
| 7,464,204 B2 | 12/2008 | Isobe | |
| 7,573,002 B2 * | 8/2009 | Myers et al. ............. | 219/137.71 |
| 7,597,582 B2 | 10/2009 | Nehling | |
| 2004/0193973 A1 | 9/2004 | Porat et al. | |
| 2005/0021874 A1 | 1/2005 | Georgiou | |
| 2005/0033888 A1 | 2/2005 | Qi | |
| 2005/0138154 A1 | 6/2005 | Seto | |
| 2005/0182881 A1 | 8/2005 | Chou et al. | |
| 2006/0149881 A1 | 7/2006 | Clayton et al. | |
| 2006/0165119 A1 | 7/2006 | Dugan | |
| 2006/0194460 A1 | 8/2006 | Chen et al. | |
| 2006/0212760 A1 | 9/2006 | Swoboda | |

(Continued)

OTHER PUBLICATIONS

U.S. Notice of Allowance dated Dec. 8, 2009 in U.S. Appl. No. 11/211,271.

(Continued)

*Primary Examiner* — Paul R Myers
*Assistant Examiner* — Trisha Vu
(74) *Attorney, Agent, or Firm* — Morris Manning & Martin, LLP; Tim Tingkang Xia, Esq.

(57) ABSTRACT

Technologies are described herein for assigning multiple frequency states within a serial I/O interface. Bits within the serial I/O stream may be placed in frequency states in addition to high and low logic states. Placing a serial I/O bit into a frequency state where the bit may be transitioned according to a set of allowed frequencies can extend the information represented by each bit slot of a cyclical data I/O bit stream beyond the typical two states of logic high and logic low. A transition counter may be provided for each bit slot of a serialized stream. Each transition counter may be incremented in response to the respective bit slot changing its state from its previous sampled state. A frequency state may be assigned to a bit slot in response to a respective transition counter range associated with that bit slot.

20 Claims, 5 Drawing Sheets

U.S. PATENT DOCUMENTS

| | | |
|---|---|---|
| 2007/0005850 A1 | 1/2007 | Chang |
| 2007/0079032 A1 | 4/2007 | Bissessur et al. |
| 2007/0260763 A1 | 11/2007 | Kasama |
| 2008/0195786 A1 | 8/2008 | Lee |
| 2009/0059955 A1 | 3/2009 | Georgiou |

OTHER PUBLICATIONS

U.S. Official Action dated Mar. 5, 2010 in U.S. Appl. No. 11/837,287.

U.S. Notice of Allowance/Allowability dated Oct. 20, 2009 in U.S. Appl. No. 11/837,256.

"SFF-8485 Specification for Serial GPIO Bus," Feb. 3, 2005, Revision 0.5, SFF Committee, 41 pages.

U.S. Appl. No. 11/211,271, filed Aug. 25, 2005 entitled "Method and Integrated Circuit for Providing Enclosure Management Services Utilizing Multiple Interfaces and Protocols", Inventor: Clas Gerhard Sivertsen.

U.S. Official Action dated May 29, 2009 in U.S. Appl. No. 11/211,271.

U.S. Patent Application No. 11/837,256, filed Aug. 10, 2007 entitled "Detecting the Presence and Activity of a Mass Storage Device", Inventor: Clas Gerhard Sivertsen.

U.S. Patent Application No. 11/837,287, filed Aug. 10, 2007 entitled "Combining Multiple SGPIO Streams to Provide Device Status Indicators," Inventor: Clas Gerhard Sivertsen.

U.S. Official Action dated May 26, 2009 in U.S. Appl. No. 11/837,287.

* cited by examiner

MULTIPLE FREQUENCY STATE DETECTION FOR SERIAL I/O INTERFACES

BACKGROUND

Storage solutions may utilize a storage backplane supporting direct mating with one or more mass storage devices. The backplane may interface with a host bus adapter (HBA). The backplane may include an integrated enclosure management device supporting the generation of visual indicators regarding the status of connected mass storage devices. For instance, an enclosure management device on a storage backplane may drive individual light-emitting diodes (LEDs) for displaying information regarding the activity, or other state information, of each of the mass storage devices connected to the storage backplane.

Signals regarding the activity status of storage devices may be provided to the backplane and its associated circuitry via a Serial General Purpose Input/Output (SGPIO) interface. A limited number of bits may be allocated to each storage device within the SGPIO interface. However, it may be desirable to communicate more status information for each storage device than would generally be available on the limited number of allocated bits within the serial SGPIO data stream.

It is with respect to these considerations and others that the disclosure presented herein is made.

SUMMARY

Technologies are described herein for assigning multiple frequency states within a serial I/O interface. The serial I/O interface may be an SGPIO configured to provide storage device status information between an HBA and a storage backplane. This information may include mass storage device activity indicators, failure indicators, location indicators, and rebuild indicators. In particular, through the use of the concepts and technologies presented herein, bits within the serial I/O stream may be placed in frequency states in addition to high and low logic states. Placing a serial I/O bit into a frequency state where the bit may be transitioned according to a set of allowed frequencies can extend the information stored within each bit slot of a cyclical data I/O bit stream beyond the typical two states of logic high and logic low.

According to one aspect presented herein, a transition counter may be provided for each bit slot of a serialized stream. Each bit within a data cycle may be provided with a respective transition counter. Each transition counter may be incremented in response to the respective bit slot changing its state from its previous sampled state. As such, transitions in the state of a bit slot between each consecutive cycle may be counted within the transition counter.

According to another aspect presented herein, transition counter increments may accumulate over a collection period. A tolerance range may be applied to each transition counter. A frequency state may be assigned to a bit slot in response to a respective transition counter range associated with that bit slot.

According to yet another aspect presented herein, an error state may be assigned to a bit slot in response to an undefined frequency. A number of transitions from the transition counter vector falling outside of the tolerance ranges associated with each of these possible frequencies may imply an error state, or an error frequency. A error state may be also be assigned in response to an initial change in frequency, as first-time frequency detection may be erroneous. The second frequency detection in the next collection period may be used instead with increased certainty.

The above-described aspects may also be implemented as a computer-controlled apparatus, a computer process, a computing system, an apparatus, as an article of manufacture such as a computer program product or computer-readable medium, or as a semiconductor integrated circuit, including but not limited to a custom application specific integrated circuit, a programmable micro-controller type device, or a field-programmable gate array device. The computer program product may be a computer storage media readable by a computer system and encoding a computer program of instructions for executing a computer process.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

These and various other features as well as advantages, which characterize the technologies presented herein, will be apparent from a reading of the following detailed description and a review of the associated drawings.

DETAILED DESCRIPTION

Figure 1:
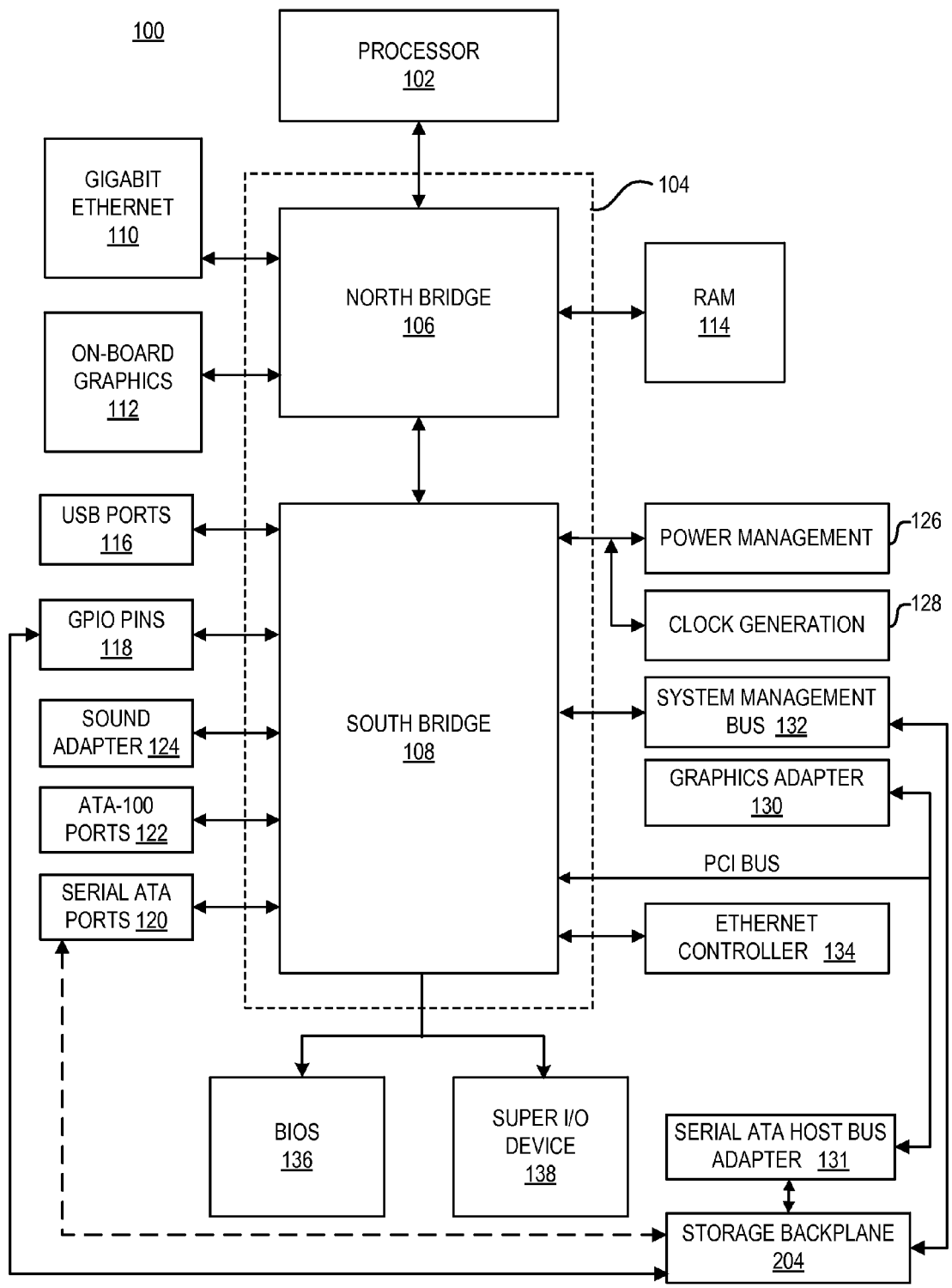
FIG. 1 is a computer architecture diagram illustrating aspects of a computer utilized as an illustrative operating environment according to embodiments presented herein.

Technologies are presented herein for assigning multiple frequency states within a serial I/O interface. In the following detailed description, references are made to the accompanying drawings that form a part hereof, and in which are shown by way of illustration specific embodiments or examples. Referring now to the drawings, in which like numerals represent like elements through the several figures, aspects of the technologies presented herein and an exemplary operating environment will be described.

FIG. 1 and the following discussion are intended to provide a brief, general description of a suitable computing environment in which the concepts presented herein may be implemented. Generally, program modules include routines, programs, components, data structures, and other types of structures that perform particular tasks or implement particular abstract data types. Moreover, those skilled in the art will appreciate that the concepts presented herein may be practiced with other computer system configurations, including hand-held devices, multiprocessor systems, embedded, microprocessor-based or programmable consumer electronics, minicomputers, mainframe computers, and the like.

Referring now to FIG. 1, details regarding an illustrative operating environment for the embodiments presented herein will be provided. In particular, FIG. 1 illustrates a computer architecture that may be utilized in conjunction with the embodiments presented herein. It should be appreciated, however, that although the embodiments described herein are discussed in the context of a conventional server computer, the concepts presented herein may be utilized with virtually any type of computing device. FIG. 1 illustrates a host computer that, as will be described in greater detail below, may utilize one or more enclosure management backplanes 204 to interface with one or more mass storage devices. The enclosure management backplanes 204 described herein may support circuitry for detecting multiple frequency states within a serial I/O interface. It should be appreciated that the architecture of the computer 100 is merely illustrative and that any type of computer capable of hosting a HBA associated with an enclosure management backplanes 204 may be utilized.

The computer 100 can comprise a baseboard also referred to as a motherboard. The motherboard can be a printed circuit board to which a various components or devices may be connected by way of wiring traces providing a system bus and various other buses and electrical communication paths. According to embodiments, a processor (also know as a central processor or CPU) 102 may operate in conjunction with a chipset 104. The CPU 102 may be a standard central processor that performs arithmetic and logical operations associated with the operation of the computer 100.

The chipset 104 may comprise a north bridge 106 and a south bridge 108. The north bridge 106 can provide an interface between the CPU 102 and the remainder of the computer 100. The north bridge 106 may also provide an interface to a random access memory (RAM) 114. The north bridge 106 may also be support an on-board graphics adapter 112. The north bridge 106 may also support networking functionality through a network or Ethernet interface, such as a gigabit Ethernet adapter 110. The gigabit Ethernet adapter 110 may support connecting the computer 100 to one or more other computers via a network. Connections made by the network adapter 110 may include local area network (LAN) or wide area network (WAN) connections. LAN and WAN networking environments are commonplace in offices, enterprise-wide computer networks, intranets, and the Internet. The north bridge 106 may be connected to the south bridge 108.

The south bridge 108 can control input/output (I/O) functions associated with the computer 100. In particular, the south bridge 108 may provide one or more universal serial bus (USB) ports 116, a sound adapter 124, an Ethernet controller 134, and one or more general-purpose input/output (GPIO) pins 118. The south bridge 108 may also provide a system management bus 132 for use in managing the various components of the computer 100. Power management circuitry 126 and clock generation circuitry 128 may also be associated with the south bridge 108. The south bridge 108 may also provide a bus for interfacing peripheral devices such as a graphics adapter 130. According to embodiments, the bus may comprise a peripheral component interconnect (PCI) bus. The PCI bus may also be utilized to interface with one or more HBAs, such as the serial ATA HBA 131. As described in greater detail below, the HBA 131 may be connected to an enclosure management backplanes 204 for providing enclosure management functionality.

According to embodiments, the south bridge 108 may be an enhanced bridge operative to provide an HBA for connecting mass storage devices to the computer 100 without the use of an add-in card such as the PCI HBA 131. For instance, the south bridge 108 may include an advanced technology attachment (ATA) adapter for providing one or more SATA ports 120 and an ATA-100 adapter for providing one or more ATA-100 ports 122. The SATA ports 120 and the ATA-100 ports 122 may be connected to one or more mass storage devices. Mass storage devices associated with the computer 100 can store operating systems, application programs, and other compiled code or data. As known to those skilled in the art, an operating system comprises a set of programs that control operations of a computer and allocation of resources. An application program is software that runs in association with the operating system software and may use computer resources made available through the operating system to perform application specific tasks. Alternatively, the serial ATA ports 120 may be connected to a storage backplane 204 for providing enclosure management functionality as described herein.

The mass storage devices connected to the south bridge 108, and their associated computer-readable media, can provide non-volatile storage for the computer 100. Although the description of computer-readable media contained herein refers to a mass storage device, such as a hard disk or CD-ROM drive, it should be appreciated that computer-readable media can be any type of computer-readable media. By way of example, and not limitation, computer-readable media may comprise computer storage media and communication media. Computer storage media can include volatile and non-volatile, removable and non-removable media implemented in any method or technology for storage of information such as computer-readable instructions, data structures, program modules or other data. Computer storage media can include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store information.

The south bridge 108 may provide a low pin count (LPC) interface. The south bridge 108 may support connection to a "Super I/O" device 138. The Super I/O device 138 may provide a number of input/output ports, including a keyboard port, a mouse port, a serial interface, a parallel port, and other types of input/output interfaces. A read-only memory (ROM) device or flash memory device may be provided for storing a basic input/output system (BIOS) 136 or an extensible firmware interface (EFI) compatible firmware that includes program code containing the basic routines for starting up the computer 100 and transferring information between elements within the computer 100. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
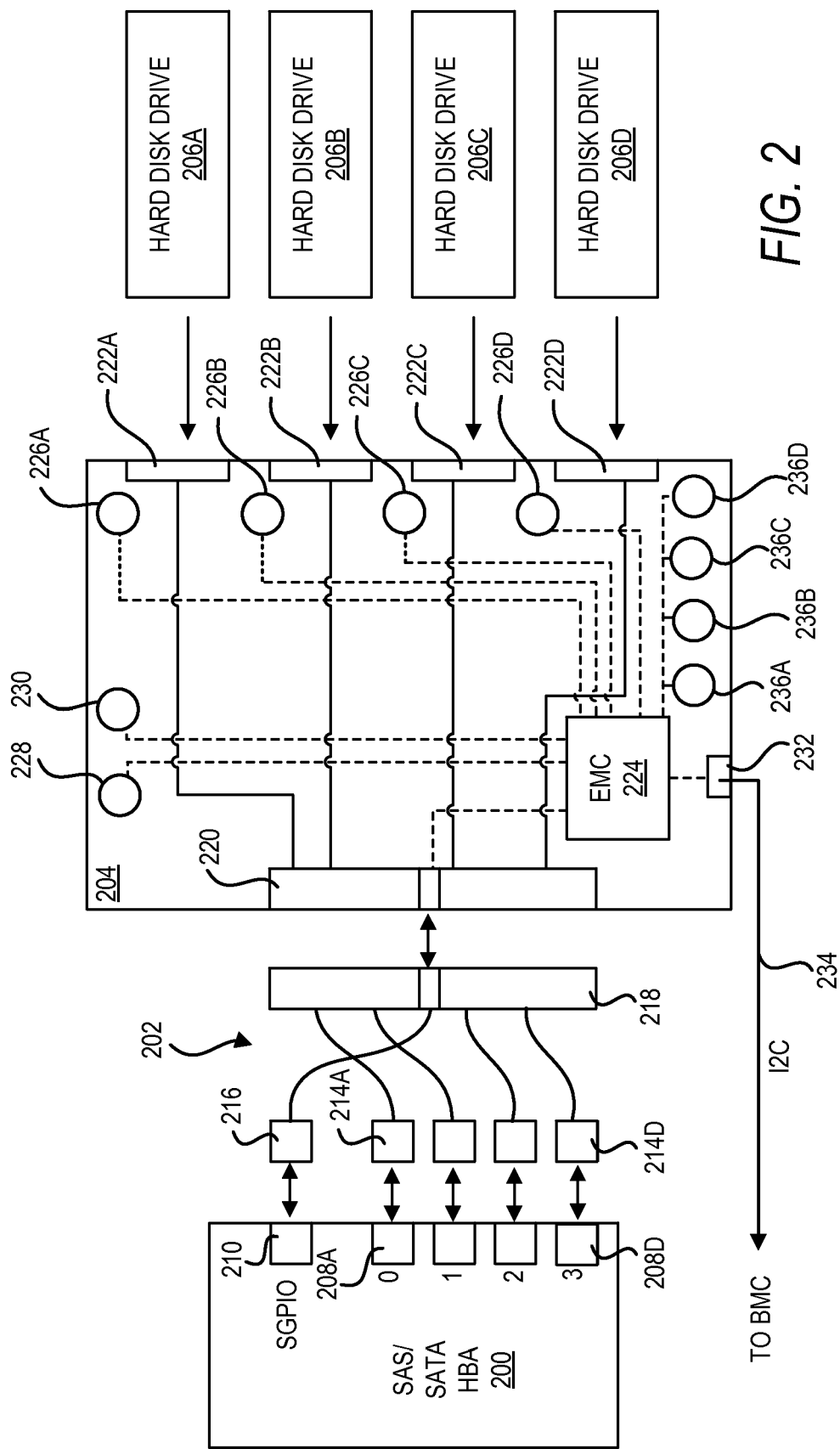
FIG. 2 is a block diagram illustrating aspects of a host bus adapter, enclosure management controller, and enclosure management backplane according to embodiments presented herein.

Turning now to FIG. 2, a block diagram illustrates aspects of a host bus adapter 200, enclosure management controller 224, and enclosure management backplane 204 according to embodiments presented herein. An HBA 200 having one or more ports 208A-208D may be utilized in conjunction with a computing system, such as the computer 100 discussed with respect to FIG. 1. According to embodiments, the HBA 200 may support SATA mass storage devices, SAS mass storage devices, or some other type of interface for mass storage.

According to embodiments, different physical interfaces may be utilized by the HBA 200 to exchange enclosure management data between the HBA 200 and the enclosure management backplane 204. For instance, an SAS compatible HBA may be equipped with a serial general purpose input/output (SGPIO) interface. As another example, a SATA compatible HBA may provide a control or management bus, such as the I2C bus from PHILIPS SEMICONDUCTORS, to exchange enclosure management data between the enclosure management backplane 204 and the HBA 200 or a baseboard management controller (BMC). An HBA 200 equipped with SGPIO may provide a SGPIO port 210 for making appropriate connection to the enclosure management backplane 204. According to embodiments, the SGPIO port 210 may alternatively support a second I2C channel. This may be a user-configurable feature.

An I2C port may be available on a BMC to communicate with the enclosure management backplane 204. According to embodiments, the system management bus (SMBus) from INTEL CORPORATION may be utilized. It should be appreciated that the particular physical interfaces described herein for exchanging enclosure management information with the backplane are merely illustrative and that any physical communications link suitable for transmitting enclosure management data may be utilized with the various embodiments presented herein. The HBA 200 may also support multiple enclosure management interfaces and protocols, such as I2C and SGPIO, multiple interfaces of the same type, or some custom enclosure management bus.

The HBA 200 may provide one or more jumpers or additional pins on the cable or connectors used to carry the enclosure management interface from the HBA 200 to the enclosure management backplane 204. These additional pins may be used to configure particular interfaces to be used when there are multiple options. The HBA 200 may utilize some form of automatic or default detection mechanism, wherein data may initially be transmitted over various available interfaces. The HBA 200 may then either receive no response on unused interfaces, or receive a response on used interfaces.

An HBA 200 may also be configured to support a particular enclosure management protocol by upgrading the firmware of the HBA 200, or by using host-side applications, command line utilities, or configuration monitors. These operations may involve a direct interface, such as a serial port interface, to the HBA 200. These access and configuration approaches may also be used to change or otherwise configure specific instructions or commands that may be sent to the enclosure management backplane 204.

One or more cables may be utilized to connect the ports 208A-208D of the HBA 200 to the enclosure management backplane 204. In particular, individual cables may be utilized to connect the ports 208A-208D to the enclosure management backplane 204. Alternatively, a multilane cable 202 may be utilized to connect the individual ports on the HBA 200 to a single multilane connector 220 on the enclosure management backplane 204. It should be appreciated that the multilane cable 202 may be equipped with multilane connectors on both ends or only on one end, as shown in FIG. 2. Where the multilane cable 202 includes only one multilane connector 218, the other end may be configured with individual connectors 214A-214D compatible with the ports 208A-208D on the HBA 200. It should also be appreciated that although the HBA 200 has been illustrated as having four ports 208A-208D, HBAs with other port configurations may be utilized. Alternatively, the backplane 204 may be configured for use with fewer or more drives. Various other configurations may also be supported.

When the HBA 200 comprises a SAS-compatible HBA and includes a SGPIO port 210, the multilane cable 202 may further include an appropriate connector 216 for connecting to the SGPIO port 210. The multilane connector 218 is also appropriately configured for passing the side-band signals from the SGPIO port 210 to an appropriate portion of the multilane connector 220 on the enclosure management backplane 204. When the HBA 200 comprises a SATA-compatible HBA and I2C is utilized, an appropriate I2C cable 234 may be utilized for connecting a BMC to the I2C port 232. The SGPIO signals may be routed from the multilane connector 220 to an enclosure management controller (EMC) 224 associated with the enclosure management backplane 204. The I2C signals may be routed to the EMC 224 associated with the enclosure management backplane 204. According to embodiments, the enclosure management backplane 204 and the EMC 224 may be configured to receive enclosure management information on multiple interfaces to thereby support the use of various types and configurations of HBA 200.

The enclosure management backplane 204 can provide connectors 222A-222D for interfacing with one or more mass storage devices, such as the hard disk drives 206A-206D. According to embodiments, the backplane 204 may be mounted within an enclosure such that the hard disk drives 206A-206D can slide into slots within the enclosure. Aligned within such enclosure slots, the hard disk drives 206A-206D may mate directly with the appropriate connector 222A-222D. The enclosure management backplane 204 may provide circuitry for routing signals between the connectors 222A-222D and the appropriate portions of the multilane connector 220. In this manner, the enclosure management backplane 204 can support communication between then HBA 200 and the connected hard disk drives 206A-206D. According to embodiments, the connectors 222A-222D may comprise receptacle connectors for receiving a SAS or SATA mass storage device.

The enclosure management backplane 204 and EMC 224 may provide a number of enclosure management functions. The EMC 224 may be configured to receive enclosure management data via various physical interfaces, such as I2C or SGPIO. The EMC 224 may be configured to perform various management functions in response to receiving this data. For instance, the EMC 224 may receive data from the HBA 200 instructing it to illuminate one of the LEDs 226A-226D for locating a particular one of the hard disk drives 206A-206D. The enclosure management IC 224 may also illuminate the LEDs 226A-226D to indicate activity on the hard disk drives 206A-206D or that one of the hard disk drives 206A-206D is being rebuilt. The LEDs 236A-236D may also be illuminated by the enclosure management IC 224 to indicate that one of the hard disk drives 206A-206D has failed. LEDs 228 and 230 may also be illuminated to provide a global indication that one of the hard disk drives 206A-206D, or a hard disk drive connected to another connected backplane is active or has failed. Various other LED configurations or status indicators may also be supported by the EMC 224.

The EMC 224 may provide information to the HBA 200. For instance, the EMC 224 may provide data to the HBA 200 indicating whether a particular drive is mated to the enclosure management backplane 204. Additional details regarding the configuration and operation of the enclosure management controller IC 224 are provided below with respect to FIG. 3.

As discussed, the enclosure management backplane 204 can provide various state indicators, such as LEDs 226A-226D, LEDs 236A-236D, LED 228, and LED 230. It should be appreciated that although these state indicators have been illustrated and described herein primarily as LEDs, other types of visual, audible, or haptic indicators may be utilized to provide indications of mass storage device state and status to a user. Providing status indication may comprise illuminating or activating an indicator, terminating or extinguishing an indicator, flashing, or otherwise modulating, an indicator, or any combination thereof.

Figure 3:
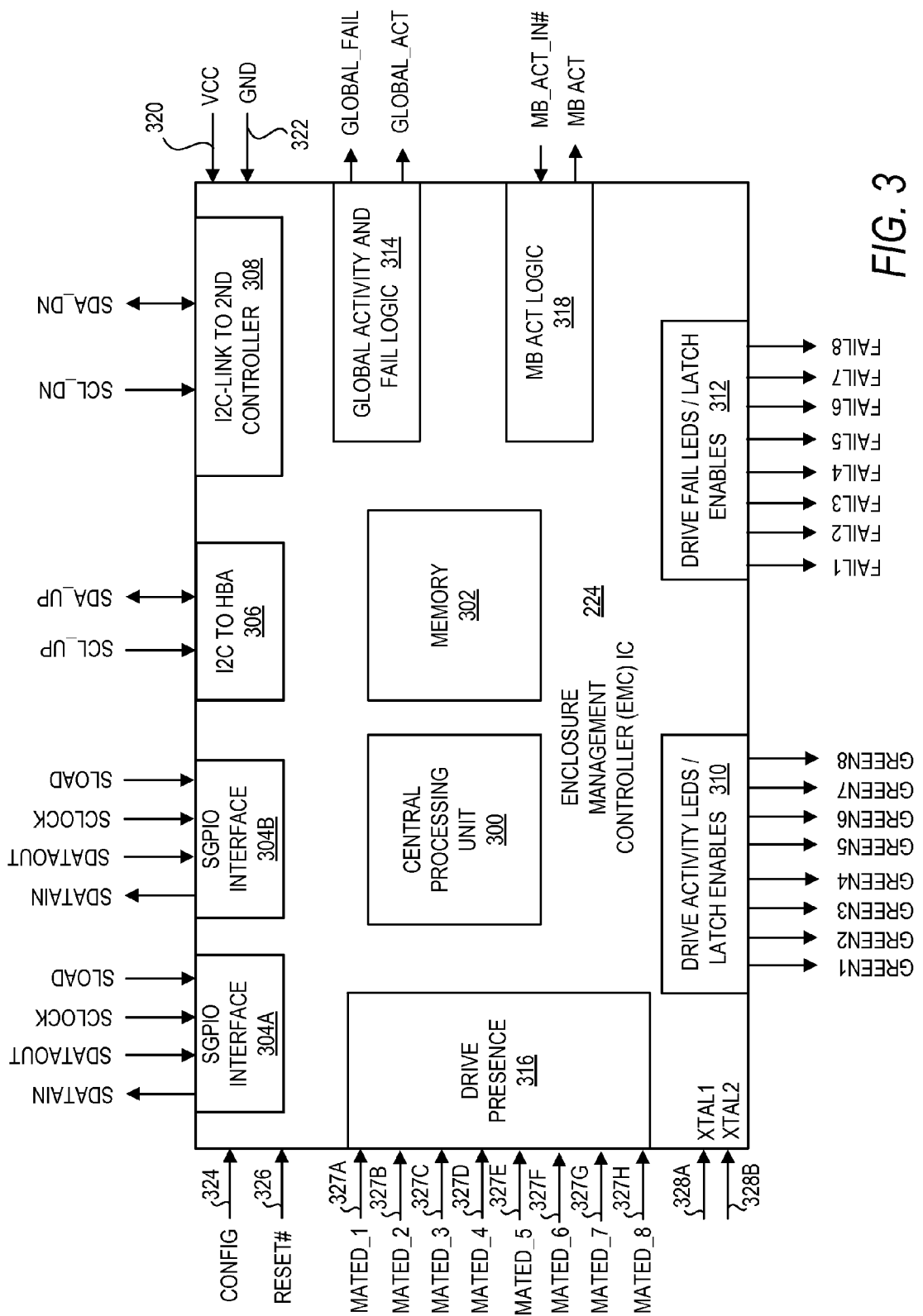
FIG. 3 is a functional block diagram illustrating aspects of an enclosure management controller integrated circuit according to embodiments presented herein.

Referring now to FIG. 3, a functional block diagram illustrates aspects of an enclosure management controller 224 according to embodiments presented herein. According to embodiments, the EMC 224 may comprise a CPU 300 and a memory 302. The CPU 300 can control the overall operation of the EMC 224. The CPU 300 may utilize the memory 302 during the performance of its processing functions. It should be appreciated that although the EMC 224 is described herein as a programmable micro-controller including a CPU 300 and memory 302, the embodiments presented herein may also be implemented utilizing a general purpose computer, a custom application specific integrated circuit (ASIC), a field-programmable gate array (FPGA) device, or any other type of IC or computing mechanism known to those skilled in the art.

According to embodiments, the EMC 224 may be equipped with multiple physical interfaces for communicating enclosure management data. For instance, the EMC 224 may include two or more SGPIO interfaces 304A-304B for communicating enclosure management data with SAS-equipped HBAs or other types of SAS initiators. The SGPIO interfaces 304A-304B may be referred to collectively, or generally, as SGPIO interfaces 304. The SGPIO interfaces 304A-304B can support four signals: serial data output (SDATAOUT), serial data input (SDATAIN), a clock (SCLOCK), and a framing signal (SLOAD). Using these signals, the EMC 224 can receive information regarding the status of connected mass storage devices, such as data indicating whether a mass storage device is active, failed, hot-spare, or otherwise.

According to embodiments, the EMC 224 can provide an I2C interface 306 for communicating enclosure management data with a BMC or the system management bus 132. The I2C interface 306 can support two signals: a serial clock line (SCL_UP), a serial data line (SDA_UP). A downstream interface 308 may be provided for connecting to a downstream I2C device. According to embodiments, the HBA 200 may communicate with the EMC 224 over a private I2C bus. The SCSI enclosure services (SES) protocol is utilized for this communication. The I2C or SGPIO bus can be routed to the enclosure management backplane 204 through the cable 202.

The EMC 224 may also include circuitry for generating output signals to drive a visual or audible indicator. For instance, an output module 310 may be provided for illuminating LEDs or other types of activity indicators when one or more of the connected hard disk drives are active.

An output module 312 may also be provided for driving LEDs when one or more of the connected hard disk drives has failed. It should be appreciated that a separate output may be provided for driving an individual LED indicating the activity or failure of each hard disk drive. According to embodiments, the EMC 224 may also provide circuitry 314 for driving indicators related to global activity and global failure. It should be appreciated that these outputs may be configured to either drive an LED directly or to connect to an upstream EMC 224. In this manner, the activity and failure of drives connected to one EMC 224 may be communicated to one or more additional upstream EMC 224. According to embodiments, the outputs of the output modules 310 and 312 may also be utilized as latch enables to drive external latches and thereby illuminate a larger quantity of LEDs or other indicators.

The EMC 224 can provide an input 320 for receiving an appropriate voltage for powering the operation of the EMC 224. This voltage may typically be five volts or 3.3 volts according to embodiments. A ground connection 322 may also be provided as a power return. The EMC 224 may provide inputs 238A-238B for receiving an appropriate clock signal, an input 324 for enabling a configuration of the IC 224, and a reset input 326 for resetting operation of the EMC 224.

The EMC 224 may provide one or more pins 327A-327H connected to a drive presence circuit 316. The drive presence circuit 316 may be configured to detect the presence of a mass storage device. According to embodiments, the drive presence circuit 316 may comprise an analog-to-digital converter (ADC) for detecting the voltage on the pins 327A-327H. Based on the detected voltage, the drive presence circuit 316 may determine whether a mass storage device has been connected. Each of the pins 327A-327H may be utilized to convey information regarding the mated status of a single respective mass storage device. According to embodiments, the drive presence circuit 316 may comprise one or more comparators configured to detect the voltage on the pins 327A-327H.

According to embodiments, the pins 327A-327H and the drive presence circuit 316 may be configured to detect the activity of a mass storage device. In this regard, the EMC 224 may be configured to determine, based on the voltage detected at each of the pins 327A-327H, whether a mass storage device associated with each of the pins 327A-327H is active. In this manner, a single one of the pins 327A-327H of the EMC 224 can be utilized to determine the mated status of a mass storage device and whether a connected mass storage device is active or inactive. The EMC 224 may transmit data regarding the mated status of each mass storage device to an HBA 200 via the SGPIO interfaces 304 or the I2C interface 306. The EMC 224 may also utilize the detected activity information to directly drive LEDs corresponding to active mass storage devices.

Figure 4:
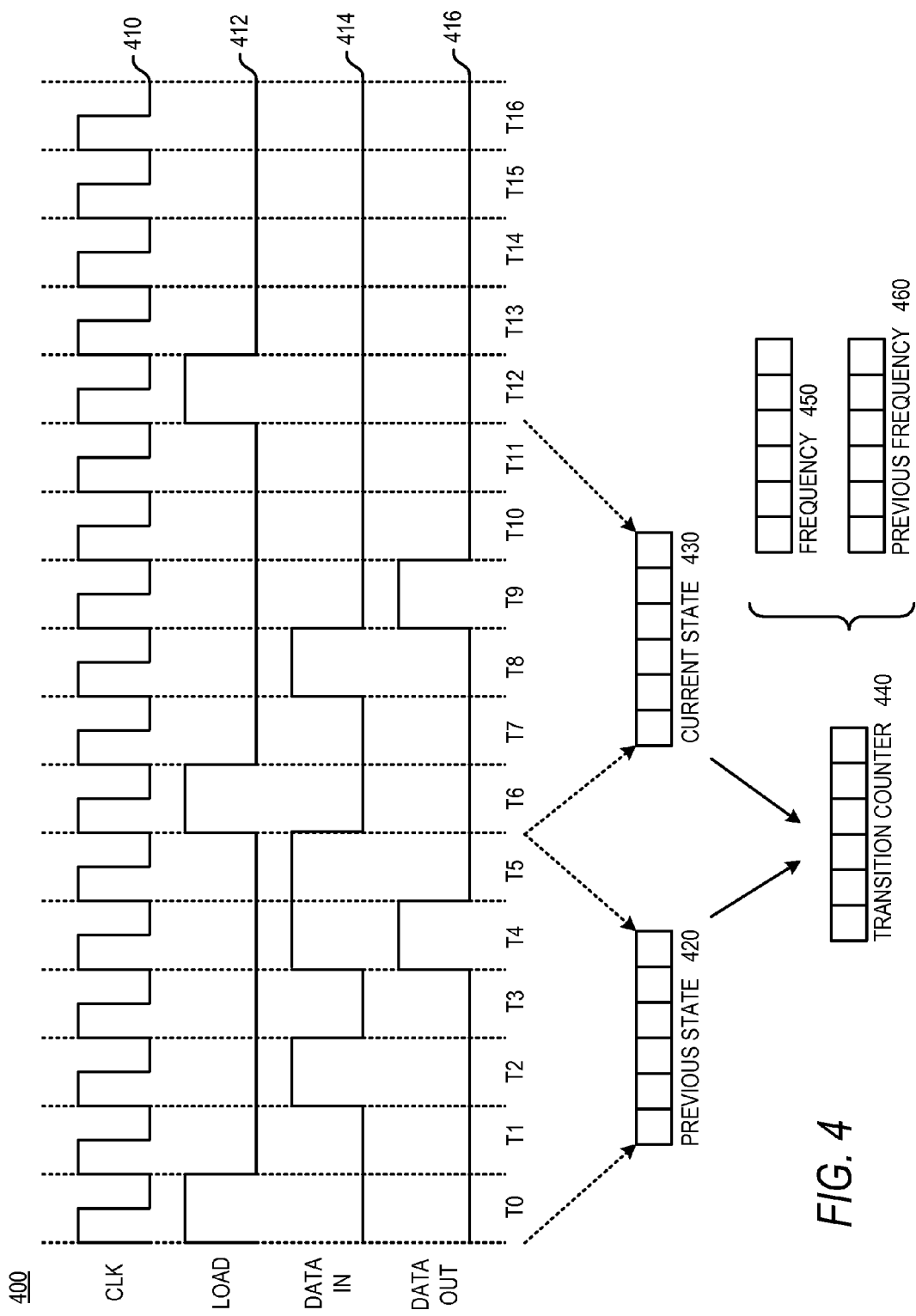
FIG. 4 is a timing diagram illustrating waveforms and associated storage structures and counters for assigning frequency states to serialized I/O interfaces according to embodiments presented herein.

Referring now to FIG. 4, a timing diagram 400 illustrates waveforms and associated storage structures and counters for assigning frequency states to serialized I/O interfaces according to embodiments presented herein. The timing diagram 400 illustrates the four signals associated with an SGPIO interface 304. These signals include a clock signal represented by a first trace 410, a load signal represented by a second trace 412, a data-in signal represented by a third trace 414, and a data-out signal represented by a fourth trace 416. The clock signal 410 can define timing periods T0-T16 for the other three signals. The load signal trace 412 can provide a framing pulse indicating the end of one sequence of bits one or both of the data lines and the beginning of another sequence of bits on the data lines.

The sequences of bits between framing pulses of the load signal trace 412 can indicate three bits for each attached hard disk drive 206. For example, an activity, locate, and fail bit may be provided for each hard disk drive 206. As such, a frame, as indicated by the load trace 412 pulses may be 3 bits in length, 6 bits in length, 9 bits in length, or some other multiple of 3 bits, where the multiple is the number of hard disk drives 206. According to an embodiment associated with the illustrated timing diagram 400, two hard disk drives 206 are represented. As such, the pulse on the load trace 412 can occur every six clock cycles two support six total bits per data cycle. These six bits may indicate an activity but, a locate bit, and a fail bit for each of the two hard disk drives 206. According to embodiments, a minimum frame length of twelve may support at least four hard disk drives 206. It should be appreciated that any number of bits, multiples of three or otherwise, may be represented within a data frame. According to embodiments, 24 data bits may be used to support up to eight hard disk drives 206 with three status bits each.

Simultaneous detection of multiple bit pattern frequency states within the bit steam can be supported. Any number of bit patterns may be supported by simultaneous frequency detection. It should be appreciated that the number of bits within the data frame may be equal to, or related to, a number of bit patterns undergoing simultaneous frequency detection. According to embodiments, this number of simultaneous frequency detections may be any integer, any multiple of three, six, nine, twelve, twenty-four, or any other value.

The first bit slot, and every sixth bit slot thereafter, within the data-in trace 414 can represent the activity state of a first hard disk drive 206. In time slot T0, this activity state is zero. In time slot T6, the activity state is also zero. In time slot T12, the activity state remains zero. As such, there were no transitions during these three frame periods, or data cycles.

Similarly, the third bit slot, and every sixth bit slot thereafter, may represent a fail state of a first hard drive 206. This fail state in time slot T2, has a value of one. In time slot T8, the fail state also has a value of one. However, in time slot T14, the fail state has a value of zero. As such there was a single transition during these three data cycles of the data-in bit stream as illustrated in trace 414.

Similarly, a fifth bit slot, and every sixth bit slot thereafter, can represent a locate state of a second hard disk drive 206. As shown in time period T4, this locate state has a value of one. In time slot T10, the locate state has a value of zero. And in time slot T16, the locate state remains at a value of zero. Thus there is one transition in this locate bit associated with the second hard disk drive 206, as illustrated in the data-in trace 414.

Upon reading each frame, or data cycle, of a bit stream, the bit states may be stored to a current state vector 430. During the next data cycle of serialized bits, the values of the current state 430 may be transitioned to a previous state 420 vector. As each current state 430 value is acquired, the value may be compared to the previous state 420 value. If the current state 430 value differs from the previous state 420 value, a transition counter 440 associated with that bit slot may be incremented.

At the end of a collection period, the values in each transition counter 440 may be used to establish values within a frequency vector 450. A tolerance range may be applied to each value in the transition counter 440 vector. The tolerance range around the measured number of transitions may be compared with the expected number of transitions associated with each possible frequency to establish the frequency 450 vector value for each bit position within the bit stream.

After each collection period, frequency values may be established for the frequency 450 vector. The previous values in the frequency 450 vector may be transitioned to the previous frequency 460 vector. The previous frequency 460 vector may be maintained to identify instances where a frequency is changing for the first time for a particular bit position. First time frequency changes may be ignored or reported as an error state as the transition counter may have failed to properly capture transitions over the entire collection period, and therefore may report an erroneous frequency value 450. The frequency may then be accurately counted in the next collection cycle.

According to embodiments, bit frequencies may be 1, 2, or 4 Hz. For example, a drive present with activity may be indicated by the associated activity bit having a frequency state of 1 Hz or 4 Hz. According to another example, a rebuild state may be indicated by a fail bit associated with a particular hard disk drive 206 having a frequency state of 1 Hz. According to yet another example, the same fail bit having a frequency state of 4 Hz may indicate a hot-spare condition of the hard disk drive 206. These various frequency states of the activity, locate, and fail bits may support additional state information for each hard disk drive 206 than the eight states typically possible given a 3 bit status vector. These status values may be used by the EMC 224 to illuminate, disable, or blink various LEDs or other indicators, as discussed with respect to FIGURED 3. It should be appreciated that the state vectors and storage vectors illustrated in FIG. 4 may be implemented as data structures or similar software/firmware constructs, as well as flip-flops or other digital circuit elements capable of maintaining logic state information. Similarly, the transition counter 440 may be implemented as an incremented array or other data structure as well as a digital counter structure within a circuit. As such, the multiple frequency state detection for serial I/O interfaces discussed herein may be implemented using software or firmware running on a microprocessor or microcontroller. Also, the multiple frequency state detection may be implemented as digital circuitry comprising state machines, digital storage elements, counters, and other digital elements within an ASIC, CPLD, FPGA, or other digital system.

Figure 5:
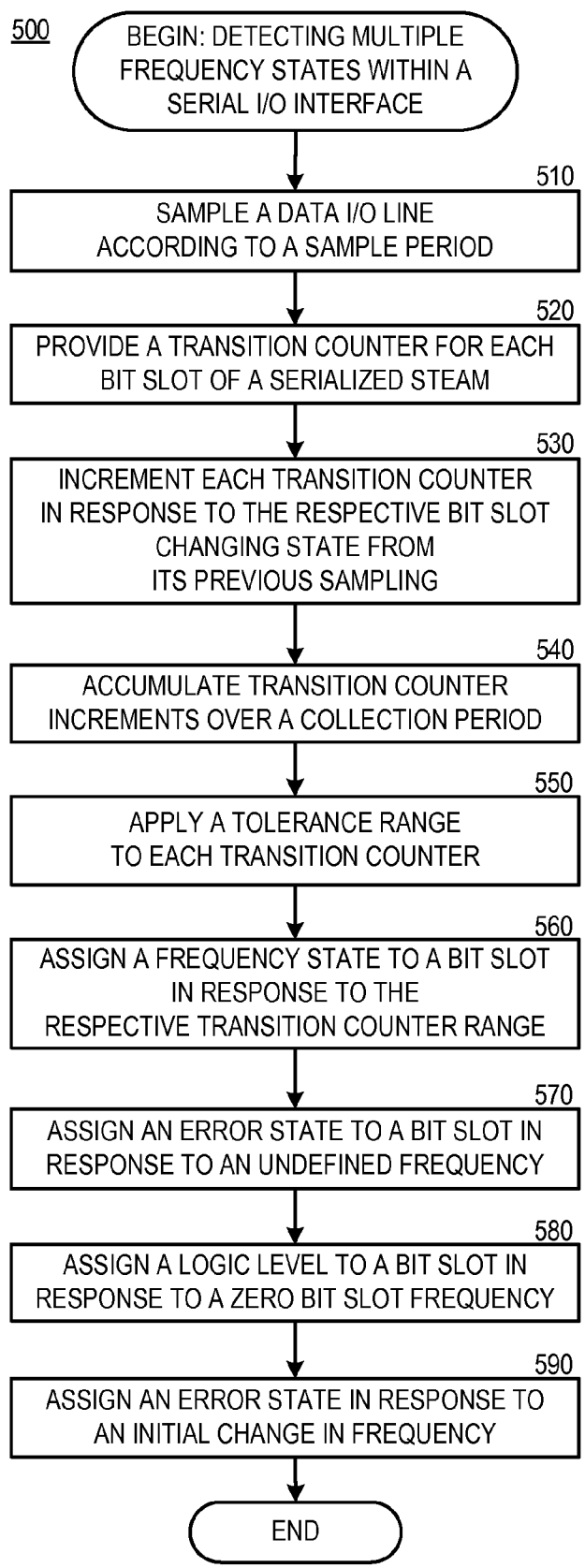
FIG. 5 is a flow diagram illustrating aspects of a method for detecting multiple frequency states within a serial I/O interface according to embodiments presented herein.

Referring now to FIG. 5, a flow diagram will be described that illustrates a method of operation provided herein for detecting multiple frequency states within a serial I/O interface according to embodiments presented herein. It should be appreciated that the logical operations of the various embodiments presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system or integrated circuit integrating the concepts presented herein. Accordingly, the logical operations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 500 may begin at operation 510 where a data I/O line can be sampled according to a sample period. For example, the data I/O line may be the data-in or the data-out signal of an SPGIO interface 304. The sampling period may be established by the clock signal of the SPGIO interface 204, a multiple of the clock, or by some other timing source.

At operation 520, a transition counter may be provided for each bit slot of a serialized stream. The bit stream period, or data cycle length, may be defined by the number of clock cycles in trace 410 between pulses in the load signal of trace 412. Each bit within one data cycle may be provided with a respective transition counter.

At operation 530, each transition counter may be incremented in response to the respective bit slot changing its state from its previous sampled state. In other words, the current state 430 vector changing from the previous state 420 vector may result in an increment in the associated bit within the transition counter 440. As such, transitions in the state of a bit between each consecutive cycle may be counted within the transition counter 440.

In operation 540, transition counter increments may accumulate over a collection period. For example, this collection period may be four seconds. It should be appreciated that collection periods of other duration may equally apply.

At operation 550, a tolerance range may be applied to each transition counter. According to embodiments the applied tolerance range may be ±2 transitions. Any other symmetric or asymmetric modification may also be applied to each counter value to establish the tolerance range. For example, if a particular transition counter accumulated ten transitions, a tolerance range of ±2 may extend the measured value of ten to a range of eight to twelve.

In operation 560, a frequency state may be assigned to a bit slot in response to a respective transition counter range. For example, over a four second period, eight transitions may be expected for an 1 Hz frequency state. After applying a tolerance range of ±2 transitions, the number of transitions associated with the 1 Hz frequency state would be between six and ten. Similarly, within a 4 second collection period, sixteen transitions may be expected for a frequency state of 2 Hz. After applying a tolerance range of ±2 transitions, the detection range associated with the 2 Hz frequency state may be a range from 14 to 18 transitions. Similarly, thirty-two transitions may be expected for the frequency state of 4 Hz. After applying the tolerance range of ±2 transitions, the frequency state of 4 Hz may be associated with the transition counter range of 30 to 34. As such, a transition counter 440 vector value in the range of 30 to 34 would imply assigning a frequency state of 4 Hz to the respective bit slot.

In operation 570, an error state may be assigned to a bit slot in response to an undefined frequency. In the example where possible frequency states include 1 Hz, 2 Hz, or 4 Hz, a number of transitions from the transition counter 440 vector outside of the tolerance ranges associated with each of these possible frequencies may imply an error state, or an error frequency.

In operation 580, a logic level may be assigned to a bit slot in response to a zero bit slot frequency. When the number of transitions in the transition counter 440 vector for a particular bit slot implies a frequency of zero, or zero transitions, that bit slot may be assigned a logic level high or a logical level low instead of a frequency. At operation 590, an error state may be assigned in response to an initial change in frequency, as first-time frequency detection may be erroneous and the second frequency detection in the next collection period may be used instead. The routine 500 may terminate after operation 590.

It will be appreciated that technologies are presented herein for detecting multiple frequency states within a serial I/O interface. Although the embodiments presented herein may have been described in language specific to computer structural features, methodological acts and by computer readable media, and implementations utilizing a semiconductor integrated circuit, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A serial interface module comprising:
   a clock signal;
   a frame signal;
   a data signal; and
   a state detector configured to
   sample the data signal according to a sampling period associated with the clock signal,
   establish a data cycle period based on the clock cycles between pulses within the frame signal,
   provide a transition counter for each bit slot within the data cycle period,
   increment each transition counter in response to the data signal during the respective bit slot of a first data cycle being in a different state than during the respective bit slot of a next data cycle,
   accumulate transition counter increments over a specified collection period, and
   assign a frequency state to the bit slot in response to the accumulated transitions.

2. The module of claim 1, wherein the state detector is further configured to apply a tolerance range to each transition counter prior to assigning a frequency.

3. The module of claim 1, wherein the state detector is further configured to assign an error state to a bit slot in response to detecting an undefined frequency state.

4. The module of claim 1, wherein the state detector is further configured to assign a logic level state to a bit slot in response to detecting a frequency state of zero.

5. The module of claim 1, wherein the state detector is further configured to assign an error state to a bit slot in response to detecting an initial change in frequency state.

6. The module of claim 1, wherein the serial interface comprises an SGPIO interface.

7. The module of claim 1, wherein the serial interface supports communication between a storage system host bus adapter and a storage system backplane.

8. The module of claim 1, wherein the serial interface supports communicating information for operating light emitting diodes associated with a data storage system.

9. The module of claim 8, wherein the information relates to one of an activity state, a locate state, and a fail state associated with a mass storage device.

10. The module of claim 1, wherein the serial interface is associated with an enclosure management controller within a data storage system.

11. A method for assigning multiple frequency states within a serial interface, the method comprising:
    sampling a data signal of the serial interface according to a sampling period;
    providing a transition counter for each bit slot within sampled data signal;
    incrementing each transition counter in response to the sampled data signal during a respective bit slot being in a different state than during a previous sampling of the respective bit slot;
    accumulating transition counter increments over a specified collection period; and
    assigning a frequency state to the bit slot in response to the accumulated transitions.

12. The method of claim 11, further comprising applying a tolerance range to each transition counter prior to assigning a frequency.

13. The method of claim 11, further comprising assigning an error state to a bit slot in response to detecting an undefined frequency state.

14. The method of claim 11, further comprising assigning a logic level state to a bit slot in response to detecting a frequency state of zero.

15. The method of claim 11 further comprising assigning an error state to a bit slot in response to detecting an initial change in frequency state.

16. The method of claim 11, wherein the serial interface comprises an SGPIO interface.

17. The method of claim 11, wherein the serial interface supports communication between a storage system host bus adapter and a storage system backplane.

18. The method of claim 11, wherein the serial interface supports communicating information for operating light emitting diodes associated with a data storage system.

19. The method of claim 18, wherein the information relates to one of an activity state, a locate state, and a fail state associated with a mass storage device.

20. A data storage system comprising:
   a storage backplane supporting the connection of one or more mass storage devices;
   a serial general purpose input/output interface configured to support communications between the storage backplane and a host bus adapter; and
   a receiver associated with the serial general purpose input/output interface, the receiver configured to
   sample a data signal of the serial general purpose input/output interface,
   provide a transition counter for each bit slot within the sampled data signal,
   increment each transition counter in response to the sampled data signal during a respective bit slot being in a different state than during a previous sampling of the respective bit slot,
   accumulate transition counter increments over a specified collection period,
   apply a tolerance range to each transition counter, and
   assign a frequency state to each bit slot in response to the tolerance range of the accumulated transitions.

* * * * *